J. M. DAVIS.
Coffee-Pot.

No. 207,952.  Patented Sept. 10, 1878.

Witnesses:
Chas. E. Lewis.
A. C. Eads.

Inventor:
John M. Davis
By his Atty
Chas. B. Mann

N. PETERS, PHOTO-LITHOGRAPHER, WASHINGTON, D. C.

UNITED STATES PATENT OFFICE.

JOHN M. DAVIS, OF RALEIGH, NORTH CAROLINA.

IMPROVEMENT IN COFFEE-POTS.

Specification forming part of Letters Patent No. 207,952, dated September 10, 1878; application filed February 13, 1878.

*To all whom it may concern:*

Be it known that I, JOHN M. DAVIS, of Raleigh, in the county of Wake and State of North Carolina, have invented a new and useful Improvement in Coffee-Pots, of which the following is a specification:

The object of my invention is to provide an improved coffee boiler and pot which shall operate by the boiling water continuously passing upward through the ground coffee inclosed in a perforated receptacle placed on the bottom of the pot, and by this and other special construction effect the thorough extraction of all the strength and flavor.

My invention will first be described in connection with the drawings, and then pointed out in the claim.

Figure 2:
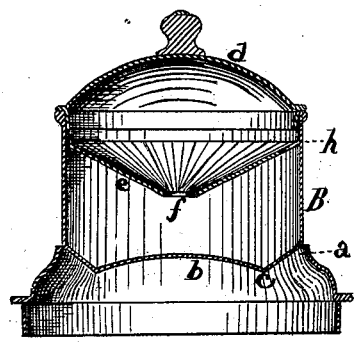
Figure 1:
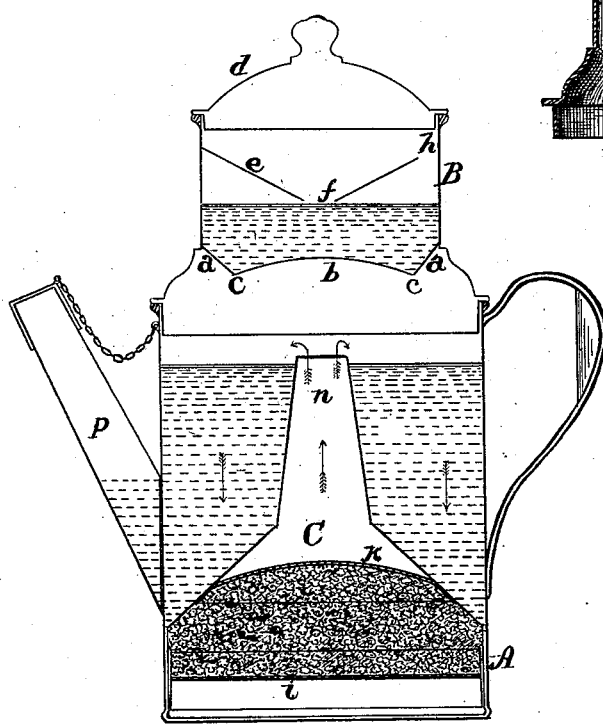
Figure 3:
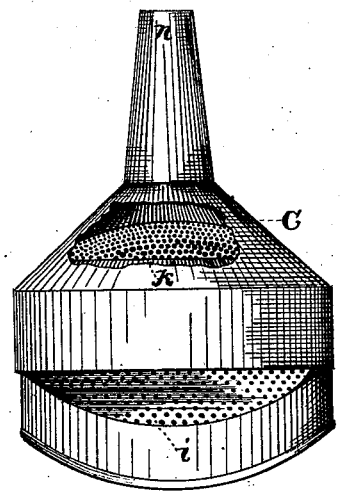

Figure 1 is a diagram of a coffee-pot embodying my improvement. Fig. 2 is a vertical section of condenser. Fig. 3 is a view of the ground-coffee receptacle.

The letter A represents the coffee-pot. B is the cover and condenser, having the lower side of its bottom beveled from the circumference downward and inward, as shown at $a$, and the central portion, $b$, concaved, by which construction an annular dripping-point, $c$, is formed. The cover $d$ is removable, and the funnel-shaped plate $e$, with its central opening, $f$, and opening $h$ on the side next to handle, is soldered fast. By this construction the water contained in the condenser is prevented from spilling out when the pot is decanted.

C represents the ground-coffee receptacle, and in shape corresponds to an inverted funnel. The bottom $i$ is removable, and is made of perforated tin, having a flange to fit within the mouth of funnel, the friction of which retains it in position. $k$ is a perforated diaphragm secured in the upper or small part of funnel, thus inclosing a space which constitutes the receptacle for the ground coffee. A stand-pipe, $n$, extends upward from the small part of the funnel, its open or top end being nearly as high as the rim of the pot. The spout $p$ is of ordinary construction, its discharge end being provided with a thimble.

The operation of my coffee-pot is as follows: Ground coffee in proper quantity is placed in the receptacle C by removing the bottom $i$, and the receptacle placed in the pot, which is then filled with boiling water to near the top of stand-pipe. The condenser should be filled with cold water, and the pot placed on the stove, so as to keep the water boiling.

It will be seen the water in the space below the receptacle will boil up through the perforated bottom $i$, and the ground coffee and the perforated diaphragm $k$, and overflow from top of pipe $n$. As this occurs other portions of the liquid enter the space on the bottom, and the ebullition through the coffee in the receptacle continues, by which process the strength is soon extracted.

The economy of this method is obvious, and my arrangement of practicing the same is convenient.

Having described my invention, I claim—

The combination, with the condenser, of the funnel-shaped plate $e$, having central opening, $f$, and side opening, $h$, as shown and described.

J. M. DAVIS.

Witnesses:
   GEO. V. STRONG, Jr.,
   W. CARY NORRIS.